United States Patent
Bekele

(10) Patent No.: US 9,005,514 B2
(45) Date of Patent: Apr. 14, 2015

(54) METHOD OF MAKING AND USING EVOH BLENDS PROVIDING IMPROVED OXYGEN RESISTANCE

(71) Applicant: Solomon Bekele, Taylors, SC (US)

(72) Inventor: Solomon Bekele, Taylors, SC (US)

(73) Assignee: Cryovac, Inc., Duncan, SC (US)

( * ) Notice: Subject to any disclaimer, the term of this patent is extended or adjusted under 35 U.S.C. 154(b) by 296 days.

(21) Appl. No.: 13/764,874

(22) Filed: Feb. 12, 2013

(65) Prior Publication Data

US 2013/0184136 A1 Jul. 18, 2013

Related U.S. Application Data

(62) Division of application No. 12/451,969, filed on Mar. 12, 2010, now Pat. No. 8,435,642.

(51) Int. Cl.
| | |
|---|---|
| B29C 49/04 | (2006.01) |
| B31B 19/00 | (2006.01) |
| B32B 27/08 | (2006.01) |
| B32B 27/30 | (2006.01) |
| B32B 27/32 | (2006.01) |
| B29C 47/00 | (2006.01) |
| B29C 47/02 | (2006.01) |
| B29K 23/00 | (2006.01) |
| B29C 47/88 | (2006.01) |

(52) U.S. Cl.
CPC ............. *B31B 19/00* (2013.01); *B31B 2237/05* (2013.01); *B32B 27/08* (2013.01); *B32B 27/306* (2013.01); *B32B 27/32* (2013.01); *B32B 2270/00* (2013.01); *B32B 2307/7244* (2013.01); *B32B 2307/736* (2013.01); *B32B 2439/70* (2013.01); *B32B 2439/80* (2013.01); *B29C 47/0021* (2013.01); *B29C 47/0026* (2013.01); *B29C 47/0052* (2013.01); *B29C 47/0057* (2013.01); *B29C 47/021* (2013.01); *B29K 2023/083* (2013.01); *B29C 47/8825* (2013.01); *B29C 47/8845* (2013.01)

(58) Field of Classification Search
None
See application file for complete search history.

(56) References Cited

U.S. PATENT DOCUMENTS

| | | |
|---|---|---|
| 5,302,417 A | 4/1994 | Yamauchi et al. |
| 6,165,573 A | 12/2000 | Hirose et al. |
| 6,255,396 B1 | 7/2001 | Ding et al. |

FOREIGN PATENT DOCUMENTS

| | | |
|---|---|---|
| EP | 0545312 | 7/1998 |
| EP | 0832928 | 6/2002 |
| GB | 2096616 | 10/1982 |

*Primary Examiner* — Monica Huson
(74) *Attorney, Agent, or Firm* — Ashley D. Wilson

(57) ABSTRACT

The presently disclosed subject matter is directed to methods of making and using films that serve as barriers to atmospheric oxygen. More particularly, the presently disclosed subject matter pertains to methods of making and using films wherein at least one layer of the film contains a blend of primary and secondary barrier components. The primary barrier component is present in the layer in an amount of from about 65 to 95 weight percent, based on the blend weight, and comprises ethylene vinyl alcohol copolymer having an ethylene unit content ranging from 21 to 30 mol %. The secondary barrier component is present in the layer in an amount of from about 5 to 55 weight percent, based on blend weight, and comprises ethylene vinyl alcohol copolymer having an ethylene unit content ranging from 41 to 50 mol %.

20 Claims, 2 Drawing Sheets

METHOD OF MAKING AND USING EVOH BLENDS PROVIDING IMPROVED OXYGEN RESISTANCE

CROSS REFERENCE TO RELATED APPLICATIONS

The subject application is a divisional of U.S. patent application Ser. No. 12/451,969, filed Mar. 12, 2010 and also claims the benefit of U.S. Provisional Patent Application Ser. No. 60/934,113, filed Jun. 11, 2007, the entire disclosures of which are hereby incorporated by reference herein.

FIELD OF THE INVENTION

The presently disclosed subject matter relates generally to the field of oxygen barrier polymers for use in accordance with the packaging of perishable products, such as food items and pharmaceutical products. More particularly, the presently disclosed subject matter is directed to compositions and films suitable for packaging end uses, such films comprising blends of ethylene vinyl alcohol copolymer and methods of making and using the same.

BACKGROUND

It is well known that limiting the exposure of oxygen-sensitive products to oxygen maintains and enhances the quality and shelf-life of the product. For instance, by limiting the oxygen transmission from the environment into an oxygen sensitive food item or pharmaceutical product in a packaging system, the quality of the product can be maintained and spoilage can be avoided. In addition, high oxygen barrier packaging also keeps the product in inventory longer, thereby reducing the costs incurred from waste and restocking.

Synthetic polymeric materials are widely used in the manufacturing of a variety of end-use articles ranging from medical devices to food containers. Within the packaging industry, there are a number of unique applications that ideally require strong and substantially clear polymers that can function as a barrier to an outside environment. One such application is the manufacture of containers and films for use with the packaging of perishable food products. Fresh-cut foods respire or maintain an influx of oxygen and an efflux of carbon dioxide. Different types of fresh foods respire at different rates, thus requiring different oxygen levels to maintain freshness, or to slow the aging process.

Continuing, the atmosphere within a packaging container can be determined by the barrier properties of the container material, such as for example, permeability. "Barrier properties", therefore, can refer to the permeability of a container material to gases and liquids such as, for example, oxygen and water. Such packaging containers strike a balance between the rates of gas and liquid exchange necessary to maintain food and pharmaceutical freshness with that necessary to minimize detrimental processes such as microbial growth. From a commercial vantage point, it is often necessary to balance the mechanical properties of the polymeric material used to construct the packaging product with the need for functionality. Accordingly, it would be desirable to develop a polymeric material for food and pharmaceutical packaging applications having improved barrier properties.

SUMMARY

In some embodiments, the presently disclosed subject matter is directed to a method of making a barrier film. The method comprises extruding a blend of a primary barrier component and a secondary barrier component through a slot die or through an annular die so that an extrudate is formed. The extrudate is either cast onto a chilled roller so that the extrudate cools to form a cast film or is oriented as it cools and solidifies such that a film is formed. The primary barrier component is present in a layer of the film in an amount of from about 65 to 95 weight percent, based on blend weight, the primary barrier component comprising ethylene vinyl alcohol copolymer having an ethylene unit content ranging from 21 to 30 mol %. The secondary barrier component is present in the layer in an amount of from about 5 to 55 weight percent, based on blend weight, the secondary barrier component comprises an ethylene vinyl alcohol copolymer having an ethylene unit content ranging from 41 to 50 mol %.

In some embodiments, the presently disclosed subject matter is directed to a method of making a barrier film. The method comprises extruding an unoriented, tubular, collapsible thermoplastic substrate, cooling the substrate to a temperature below its melt temperature, and inflating the substrate to form an inflated tubular substrate. The method further comprises passing the inflated tubular substrate through a coating die and trapping the portion of the inflated, tubular substrate that passes through said coating die between two spaced apart pairs of pinch rollers. A molten coating layer of thermoplastic material from the circular coating die is then extruded onto and around the inflated tubular substrate, so that a coated multilayer film is produced. The coated multilayer film is then heated to a temperature of from about 180° F. to about 220° F. and the coated multilayer film product is oriented while the coated multilayer film is in the solid state, whereby a heat-shrinkable multilayer film is produced. The film comprises a primary barrier component present in an amount of from about 65 to 95 weight percent, based on blend weight, the primary barrier component comprising ethylene vinyl alcohol copolymer having an ethylene unit content ranging from 21 to 30 mol %. The film further comprises a secondary barrier component present in an amount of from about 5 to 55 weight percent, based on blend weight, the secondary barrier component comprising ethylene vinyl alcohol copolymer having an ethylene unit content ranging from 41 to 50 mol %.

In some embodiments, the presently disclosed subject matter is directed to a method of making a package. The method comprises providing a first polymeric film comprising a layer comprising a blend of a primary barrier component and a secondary component and heat sealing the film upon itself or to another film to form an enclosed package for a product. The primary component is present in the layer in an amount of from about 65 to 95 weight percent, based on the blend weight, the primary barrier component comprising ethylene vinyl alcohol copolymer having an ethylene unit content ranging from 21 to 30 mol %. The secondary barrier component is present in the layer in an amount of from about 5 to 55 weight percent, based on blend weight, the secondary barrier component comprising ethylene vinyl alcohol copolymer having an ethylene unit content ranging from 41 to 50 mol %.

DETAILED DESCRIPTION

I. Definitions

Figure 1:
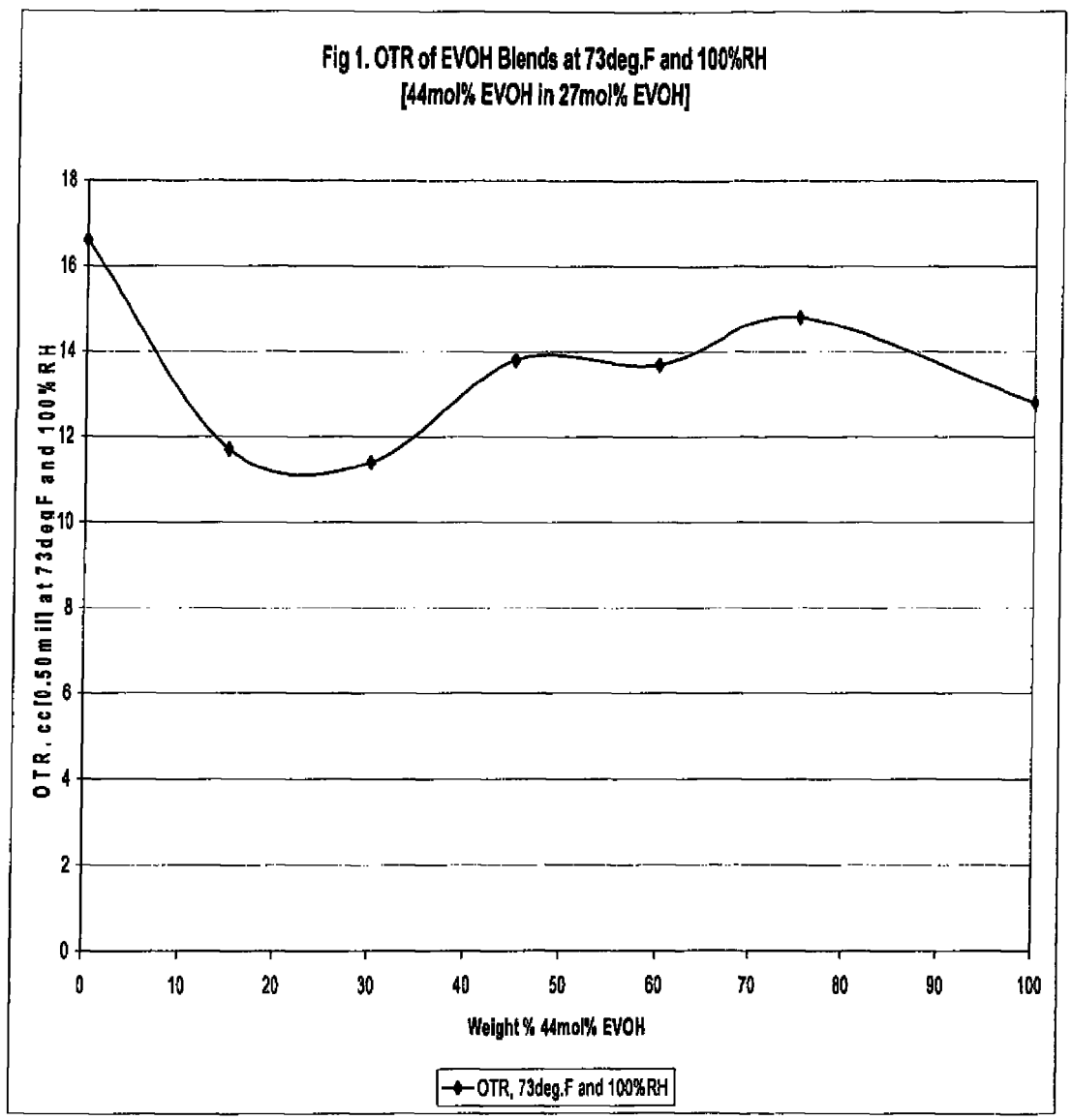
FIG. 1 is a line graph illustrating the weight % of 44 mol % EVOH in the barrier layer of some embodiments of the disclosed films versus oxygen transmission rate at 73° F. and 100% RH.

While the following terms are believed to be understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, device, and materials are now described.

Following long-standing patent law convention, the terms "a", "an", and "the" can refer to "one or more" when used in the subject specification, including the claims. Thus, for example, reference to "a film" (e.g., "a barrier film") includes a plurality of such films, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed film and methods.

The term "abuse layer" as used herein refers to a layer of a film that can resist abrasion, puncture, and/or other potential causes of reduction of package integrity, and/or potential causes of reduction of package appearance quality.

As used herein, the term "barrier" refers to a layer of a film that can significantly retard the transmission of one or more gases (e.g., $O_2$).

As used herein, the term "bulk layer" refers to a layer of a film that can increase the abuse resistance, toughness, or modulus of a film.

The term "copolymer" as used herein refers to a polymer formed by the polymerization reaction of at least two different monomers and is inclusive of random copolymers, block copolymers, graft copolymers, and the like.

As used herein, the term "ethylene/alpha-olefin copolymer" refers to copolymers of ethylene with one or more comonomers selected from $C_3$ to $C_{10}$ alpha-olefins, including but not limited to propene, butene-1, hexene-1, and octene-1, wherein the molecules of the copolymers comprise long polymer chains with relatively few side chain branches arising from the alpha-olefin that was reacted with ethylene. This molecular structure can be contrasted with conventional high pressure low or medium density polyethylenes that are highly branched with respect to ethylene/alpha olefins and which high pressure polyethylenes contain both long chain and short chain branches. Thus, in some embodiments, ethylene/alpha olefin can include such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, ESCORENE™ or EXCEED™ resins supplied by ExxonMobile; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers.

As used herein, the term "film" refers to plastic web materials having a thickness of about 0.50 mm (20 mils) or less, such as for example, about 0.25 mm (10 mils) or less.

As used herein, the term "inner layer" refers to any layer of a multilayer film having both of its principal surfaces directly adhered to another layer of the film.

As used herein, the term "inside layer" refers to an outer film layer of a multilayer film packaging a product that is closest to the product, relative to the other layers of the multilayer film. "Inside layer" also is used with reference to the innermost layer of a plurality of concentrically arranged layers simultaneously coextruded through an annular die, or the inside layer of a seamed film tubing.

As used herein, the term "lamination" refers to the bonding of two or more film layers to each other, e.g., by the use of polyurethane adhesive and the like.

"Linear low density polyethylene" as used herein refers to polyethylene having a density between about 0.917 and about 0.925 grams per cubic centimeter, produced by Zeigler/Natta catalysis.

As used herein, the term "machine direction" refers to the direction along the length of a film, i.e., in the direction of the film as it is formed during extrusion and/or coating.

As used herein, the term "mer" refers to a unit of a polymer that is derived from a monomer used in the polymerization reaction.

The term "orientation ratio" (i.e., the product of the extent to which a film is oriented in several directions, usually two directions perpendicular to one another) can be used when describing the degree of orientation of a given film. Orientation in the machine direction can be referred to as "drawing," whereas orientation in the transverse direction can be referred to as "stretching." For films extruded through an annular die, stretching can be obtained by blowing the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls.

As used herein, the term "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces is adhered to another layer of the film.

As used herein, the term "outside layer" refers to the outer layer of a multilayer film packaging a product that is furthest from the product relative to the other layers of the multilayer film. "Outside layer" also is used with reference to the outermost layer of a plurality of concentrically arranged layers of a seamless tubing, or the outermost layer of a seamed film tubing.

As used herein, "oxygen transmission rate" refers to the rate of oxygen gas passing through an entire film structure. For perishable food packaging applications, the oxygen transmission rates desirably should be minimized. Typical films are required to have an $O_2$ transmission rates of less than about 20 $cm^3/m^2$ for a 24 hour period at 1 atmosphere, 0% relative humidity and 23° C., preferably less than 15 $cm^3/m^2$, more preferably less than 10 $cm^3/m^2$. Oxygen transmission can be measured according to ASTM D-3985-81, incorporated herein in its entirety by reference thereto.

As used herein, the term "package" refers to a film configured around a product.

As used herein, the term "polymer" herein refers to the product of a polymerization reaction, and in some embodiments can be inclusive of homopolymers, copolymers, terpolymers, tetrapolymers, and the like.

As used herein, the term "primary barrier component" refers to a particular barrier component that makes up a relatively high percentage of the barrier layer, by weight, compared to a secondary barrier component.

As used herein, the term "seal" refers to a bonding of a first film surface to a second film surface created by heating (e.g., by means of a heated bar, hot air, infrared radiation, ultrasonic sealing, and the like) the respective surfaces to at least their respective seal initiation temperatures.

The term "seal layer" as used herein refers to a layer of a film that can be involved in the sealing of the film to itself, another film layer of the same or another film, and/or another article that is not a film. In general, sealant layers employed in the packaging art have included thermoplastic polymers, such as polyolefin, polyamide, polyester, and polyvinyl chloride.

As used herein, the term "secondary barrier component" refers to a particular barrier component that makes up a relatively low percentage of the barrier layer, by weight, compared to a primary barrier component.

The term "tie layer" as used herein refers to a layer of a film that can provide interlayer adhesion to adjacent layers that include otherwise non-adhering or weakly adhering polymers. Suitable tie layers can include, but are not limited to, anhydride modified (i.e., anhydride grafted) linear low density polyethylene, anhydride modified high density polyethylene, polyamide, and combinations thereof.

"Total free shrink" as used herein refers to the percent dimensional change in a 10 cm×10 cm specimen of film, when shrunk at a specified test temperature such as 85° C. (185° F.), with the quantitative determination being carried out according to ASTM D 2732, as set forth in the 1990 Annual Book of ASTM Standards, vol. 08.02, 368-371, the entire disclosure of which is hereby incorporated herein by reference in its entirety. In some embodiments, "total free shrink" can refer to the totality of the free shrink in both the longitudinal direction and the transverse direction. In some embodiment the disclosed film has a total free shrink at 185° F. of less than 10%, measured in accordance with ASTM D-2732. In some embodiments, the disclosed film has a total free shrink at 185° F. of from about 10% to about 150%, measured in accordance with ASTM D-2732.

As used herein, the term "transverse direction" refers to the direction across a film, i.e., the direction that is perpendicular to the machine direction.

As used herein, terminology employing a "/" with respect to the chemical identity of a copolymer (e.g., "an ethylene/alpha-olefin copolymer"), identifies the comonomers that are copolymerized to produce the copolymer. Thus, as used herein, "ethylene alpha-olefin copolymer" is the equivalent of "ethylene/alpha-olefin copolymer".

All compositional percentages used herein are presented on a "by weight" basis, unless designated otherwise.

II. Barrier Films

II.A. EVOH Blend

In general, ethylene vinyl alcohol ("EVOH") copolymers have various advantageous properties, such as oxygen impermeability, mechanical strength, etc., and find application in many uses including films, sheets, materials for containers, textile fibers, and the like. As would be readily apparent to one of ordinary skill in the art, EVOH represents a family of copolymers that can be made by hydrolyzing ethylene-vinyl acetate ("EVA") copolymers with high vinyl acetate ("VA") content. Those containing about 20-35% ethylene can be useful as barriers to many vapors and gases. In some embodiments, EVOH can include saponified or hydrolyzed ethylene/vinyl acetate copolymers, such as those having a degree of hydrolysis of at least about 50%. In some embodiments, as used herein, EVOH can have an ethylene content ranging from about 21 to about 50 mole percent.

In some embodiments, the presently disclosed subject matter is directed to a film comprising a blend of a relatively high amount of a 21 to 30 mol % (e.g., 27 mol %) EVOH copolymer and relatively small amount of a 41 to 50 mol % (e.g., 44 mol %) EVOH copolymer, based on total blend weight. For example, the film can comprise a relatively high amount of a 21 mol %, 22 mol %, 23 mol %, 24 mol %, 25 mol %, 26 mol %, 27 mol %, 28 mol %, 29 mol %, or 30 mol % EVOH copolymer and a relatively small amount of a 41 mol %, 42 mol %, 43 mol %, 44 mol %, 45 mol %, 46 mol %, 47 mol %, 48 mol %, 49 mol %, or 50 mol % EVOH copolymer, based on total blend weight. Thus, in some embodiments, the primary barrier component of the disclosed film can comprise a 25 to 28 mol % EVOH copolymer. Continuing, in some embodiments, the secondary barrier component can comprise a 43 to 45 mol % EVOH copolymer.

Such a blend of a 21 to 30 mol % EVOH with a 41 to 50 mol % EVOH unexpectedly has improved oxygen barrier properties at 100% relative humidity compared to either material alone. Accordingly, the blend exhibits improved barrier properties at wet conditions without impacting the barrier properties at dry conditions. Further advantages include improved extrudability compared to a 21 to 30 mol % grade and the subsequent film tends to have fewer creases, fewer wrinkles, and improved abuse resistance.

The oxygen transmission rate of the blend at 0% relative humidity is approximately equivalent to the OTR of the 21 to 30 mol % EVOH copolymer. In some embodiments, the oxygen transmission rate of films comprising the disclosed EVOH blend is from about 0.1 to 30 $cc/m^2/day$ at 73° F., 1 atmosphere, and 0% relative humidity, measured in accordance with ASTM D-3985. In some embodiments, the composition and amount of a 21 to 30 mol % EVOH copolymer with a 41 to 50 mol % EVOH copolymer are selected such that the oxygen-barrier layer exhibits an oxygen transmission rate equal to or slightly higher than a layer of the same thickness composed of 100 weight percent of a 21 to 30 mol % EVOH component.

The oxygen barrier of a 21 to 30 mol % EVOH is best among EVOH grades up to about 80% relative humidity. However, the oxygen barrier of a 41 to 50 mol % EVOH is better in the range of about 80-100% relative humidity. As disclosed in more detail herein below, a blend of these two grades of about 65 weight percent of the 21 to 30 mol % EVOH and 35 weight percent of the 41 to 50 mol % EVOH exhibits improved wet oxygen transmission rate. Thus, blends of 21 to 30 mol % EVOH with 41 to 50 mol % EVOH have improved oxygen transmission rates at 100% relative humidity compared to either material alone, or to any other EVOH of mol % between these two. The improvement holds true up to about 35 wt% of the 41 to 50 mol % EVOH in the blend. In this range, the oxygen transmission rate at 0% relative humidity is the same as that of the 21 to 30 mol %, or very slightly above.

II.B. Additional Barrier Components

As discussed hereinabove, the barrier films can comprise one or more barrier polymers that decrease the oxygen transmission rate through the barrier layer and thus the film incorporating the barrier layer. In some embodiments, the barrier layer can be the only layer of a monolayer film. For example, the presently disclosed subject matter can include monolayer barrier films comprising a blend of (A) a primary barrier component present in an amount of from about 65 to 95 weight percent, based on blend weight, the primary barrier component comprising a 21 to 30 mol % ethylene vinyl alcohol copolymer; and (B) a secondary barrier component present in an amount of from about 5 to 55 weight percent, based on blend weight, the secondary barrier component comprising a 41 to 50 mol % ethylene vinyl alcohol copolymer.

In some embodiments, the barrier layer can be an internal layer of a multilayer film. As used herein, the term "internal layer" can refer to a layer of the film that is between two other layers of the film. Thus, in some embodiments, the film according to the presently disclosed subject matter can comprise a total of from about 1 to 20 layers (i.e., 1, 2, 3, 4, 5, 6, 7, 8, 9, 10, 11, 12, 13, 14, 15, 16, 17, 18, 19, or 20 layers).

In some embodiments, the film as disclosed herein can have any total thickness desired, so long as the film provides the desired properties for the particular packaging operation in which the film is used. Thus, in some embodiments, the film can have a thickness of from about 0.05 to about 10 mils, from about 0.05 to 2 mils, from about 0.05 mils to about 0.5 mils, or from about 0.1 to about 0.3 mils.

In some embodiments, the disclosed barrier film can be a multilayer film comprising first layer containing a thermoplastic polymer and a second layer that serves as a barrier layer, the second layer comprising the blend of the primary barrier component and the secondary barrier component disclosed herein above. In some embodiments, the first layer is a first outer film layer and the second layer is an inner film layer, with the multilayer film further comprising a third layer that is a second outer film layer that serves as an abuse layer, the second outer layer comprising at least one member selected from the group consisting of ethylene/alpha-olefin copolymer, ethylene homopolymer, propylene/alpha-olefin copolymer, propylene homopolymer, and combinations thereof.

In some embodiments, the film can further comprise a fourth layer that serves as a first tie layer and that is between the first layer and the second layer, the fourth layer comprising at least one member selected from the group comprising (but not limited to): anhydride modified polymer, polyamide, blends of polyamide, and combinations thereof.

In some embodiments, the film can further comprise a fifth layer that serves as a second tie layer and that is between the second layer and the third layer, the fifth layer comprising at least one member selected from the group comprising (but not limited to): anhydride modified polymer, polyamide, blends of polyamide, and combinations thereof.

In some embodiments, the film can further comprise a sixth layer that is an inner layer serving as a bulk layer, and that comprises at least one member selected from the group consisting of: ethylene/alpha-olefin copolymer, ethylene homopolymer, propylene/alpha-olefin copolymer, propylene homopolymer, and combinations thereof, the sixth layer being either between the first layer and the fourth layer, or between the second layer and the fifth layer.

Continuing, in some embodiments, the barrier film can contain additives as deemed necessary to impart desired physical properties, such as but not limited to, printability, increased gloss or a reduced blocking tendency. Examples of additives can include stabilizers, ultra-violet screening agents, oxidants, anti-oxidants, pigments/dyes, fillers, and/or the like with other components. The additives can be used alone or in combination to form various formulations of the polymer. Effective additive amounts and processes for inclusion of the additives to polymeric compositions are known to those of ordinary skill in the art.

In some embodiments, the film of the presently disclosed subject matter can comprise a sealant layer (i.e., a seal layer) adapted to facilitate the heat-sealing of the film to itself or to another object, such as a substrate. In general, sealant layers employed in the packaging art have included the genus of thermoplastic polymers, including (but not limited to) thermoplastic polyolefin polyamide, polyester, polyvinyl chloride, homogeneous ethylene/alpha-olefin copolymer, ethylene/vinyl acetate copolymer, ionomer, and combinations thereof.

In some embodiments, the barrier film of the presently disclosed subject matter can comprise an abuse layer. The abuse layer can be an outer film layer and/or an inner film layer, so long as the film layer serves to resist abrasion, puncture, or other potential causes of reduction of package integrity or package appearance quality. In some embodiments, abuse layers can comprise any polymer, so long as the polymer contributes to achieving an integrity goal and/or an appearance goal. In some embodiments, the abuse layer can include, but is not limited to, polyamide, ethylene/propylene copolymer, nylon 6, nylon 6/6, amorphous nylon, ethylene/propylene copolymer, and combinations thereof.

In some embodiments, the presently disclosed film can comprise a bulk layer that functions to increase the abuse resistance, toughness, and/or modulus of the film. Bulk layers generally comprise polymers that are inexpensive relative to other polymers in the film that provide some specific purpose unrelated to abuse-resistance, modulus, etc.

In some embodiments, the barrier film of the presently disclosed subject matter can comprise a tie layer adapted for improving the adherence of one layer of said film to another layer. For example, the barrier film can comprise one or more tie layers, each directly adhered to a barrier layer. In some embodiments, tie layers can comprise any nonpolar polymer having a polar group grafted thereon, so that the polymer is capable of covalent bonding to polar polymers. In some embodiments, tie layers can comprise at least one member of the group including, but not limited to, modified polyolefin, modified ethylene/vinyl acetate copolymer, homogeneous ethylene/alpha-olefin copolymer, and combinations thereof. In some embodiments, tie layers can comprise at least one member selected from the group including, but not limited to, anhydride modified grafted linear low density polyethylene, anhydride grafted low density polyethylene, homogeneous ethylene/alpha-olefin copolymer, and/or anhydride grafted ethylene/vinyl acetate copolymer.

The film can have an OTR of about 0.1-30 (0.5 mil) cc per square meter per day per 1 atmosphere of oxygen pressure differential measured at 0% relative humidity and 73° C., and less than about 50 cc per square meter per day per 1 atmosphere of pressure measured at 100% RH and 73° C. Unless otherwise noted, all references to oxygen transmission rate herein are measured at these conditions according to ASTM D-3985. In some embodiments, at 100% relative humidity, improvements of about 5 to 30% are observed.

III. Manufacture of the Barrier Film

The composition of the disclosed film can be extruded and processed using any of a number of methods known to those of ordinary skill in the art, for example, by the methods disclosed in U.S. Pat. No. 3,741,253 to Brax et al., U.S. Pat. No. 4,278,738 to Brax of al., and U.S. Pat. No. 4,284,458 to Schirmer, incorporated herein by reference in their entireties. Thus, any suitable method of making a film having an oxygen barrier layer can be used to make a film in accordance with the presently disclosed subject matter, so long as the method utilizes an above-described EVOH blend composition. Suitable methods include tubular cast coextrusion, such as that disclosed in U.S. Pat. No. 4,551,380 to Schoenberg, herein incorporated by reference in its entirety, tubular or flat cast extrusion, blown bubble extrusion (for monolayer films) or coextrusion (for multilayer films), and by techniques well known in the art.

For example, in some embodiments, the disclosed film can be prepared by first extruding an unoriented, tubular, collapsible thermoplastic substrate. The substrate is then cooled to a temperature below its melt temperature. An inflated tubular substrate is formed by inflating the substrate. The inflated tubular substrate is then passed through a coating die and the portion of the inflated, tubular substrate that passes through said coating die is trapped between two spaced apart pairs of pinch rollers. A molten coating layer of thermoplastic material is extruded from the circular coating die, onto and around the inflated tubular substrate, so that a coated multilayer film is produced. Next, the coated multilayer film is heated to a temperature of from about 180° F. to about 220° F. and the coated multilayer film product is oriented while the coated multilayer film is in the solid state to produce a heat-shrinkable multilayer film is produced. The coating layer can comprise a blend of: (1) a primary barrier component present in an amount of from about 65 to 95 weight percent, based on blend weight, the primary barrier component comprising a 21 to 30 mol % ethylene vinyl alcohol copolymer; and (2) a secondary barrier component present in an amount of from about 5 to 55 weight percent, based on blend weight, the secondary barrier component comprising a 41 to 50 mol % ethylene vinyl alcohol copolymer.

In some embodiments, the disclosed film can be prepared by first extruding a blend of the primary barrier component and the secondary barrier component through a slot die so that an extrudate is formed. The extrudate is then cast onto a chilled roller so that the extrudate cools to form a cast film.

In some embodiments, the disclosed film can be prepared by extruding a blend of the primary barrier component and the secondary barrier component through an annular die such that an extrudate is formed. The extrudate is then oriented as it cools and solidifies so that a film is formed.

In some embodiments, the film can be cross-linked or non-cross-linked, oriented or unoriented, heat shrinkable or non-heat shrinkable. Where the film is heat shrinkable, it can have a total free shrink at 85° C. (185° F.) of between 10 and 100%. All or a portion of the presently disclosed film can be irradiated to induce crosslinking. In the irradiation process, the film is subjected to an energetic radiation treatment, such as corona discharge, plasma, flame, ultraviolet, X-ray, gamma ray, beta ray, and high energy electron treatment, that induces crosslinking between molecules of the irradiated material. Thus, in some embodiments, the disclosed film can comprise a crosslinked polymer network. The proper dosage level can be determined by standard dosimetry methods known to those of ordinary skill in the art, and the precise amount of radiation to be used is of course dependent on the particular film structure and its end use. Thus, in some embodiments, the film can be irradiated at a level of from 0.5-15 megarads (MR), such as 1-12 MR. Further details on the irradiation of polymeric films can be found in, for example, U.S. Patent No. 4,064,296 to Bornstein et al., U.S. Pat. No. 4,120,716 to Bonet, and U.S. Pat. No. 4,879,430 to Hoffman, incorporated herein by reference in their entireties.

In some embodiments, it can be undesirable to irradiate one or more film layers, for example, a film layer comprising PVdC. To that end, one or more substrate layers can be extruded and irradiated, and any of the PVdC-containing layers can then be applied to the irradiated substrate, for example, by an extrusion coating process.

In some embodiments, the film can be oriented in either the machine (i.e., longitudinal) or transverse direction, or in both directions (i.e., biaxially oriented), for example, to enhance the strength, optics, and durability of the film. A web or tube of the film can be uniaxially or biaxially oriented by imposing a draw force at a temperature where the film is softened (see, for example ASTM 1525) but at a temperature below the film's melting point. The film can then be quickly cooled to retain the physical properties generated during orientation and to provide a heat-shrink characteristic to the film. The film can be oriented using, for example, a bubble process. These processes are known to those skilled in the art.

IV. End Uses of the Barrier Film

The disclosed barrier film can be converted to an end-use article by any suitable method (e.g., a plastics shaping process). The end-use article can be any of a wide variety, including but not limited to pipes, films, bottles, fibers, containers, cups, lids, plates, trays, and the like. Additional end use articles are apparent to those of ordinary skill in the art. More particularly, the end-use article can be a film that can be further formed into a packaging container for a consumer product, such as (but not limited to) fresh cut foods and/or pharmaceutical products.

A package comprising the presently disclosed film can enclose a product, such as a food product, including but not limited to cheese, meat products, fresh produce, and the like. In some embodiments, the package can be a bag comprising the disclosed film. For example, the film can be formed into a bag, such as by sealing the inside layer to itself in selected regions, or by sealing the inside layer to itself in selected regions, or by sealing the inside layer to the outside layer in selected regions. Useful bag configuration can include an end seal bag, a side-seal bag, an L-seal bag, and a pouch.

Thus, one of ordinary skill in the art would readily understand that the packaging article comprising the oxygen barrier composition can be used to package any product for which it is desirable to inhibit oxygen damage during storage, e.g., food, beverages, pharmaceuticals, medical products, corrodible metals, electronic devices, batteries, and the like. The presently disclosed subject matter can further be useful for packaging products where it is desirable to maintain an oxygen barrier for a long period of time, e.g., beer, wine and other beverages.

It is to be understood that variations of the presently disclosed subject matter can be made without departing from the scope of the disclosed discovery, which is not limited to the specific embodiments and examples disclosed herein, but extends to the claims presented below.

EXAMPLES

Table 1 presents a summary of the polymers used in the Examples.

TABLE 1

Resin Identification

| ID | Manufacturer | Trade Name |
|---|---|---|
| EVOH#1 | EVALCA/Kuraray (Tokyo, Japan) | Eval L171B |
| EVOH#2 | Nippon Gohsei (Tokyo, Japan) | SOARNOL ET3803 |
| EVOH #3 | Nippon Gohsei (Tokyo, Japan) | SOARNOL AT4403 |
| A | Ampacet (Cartersville, Georgia, United States of America) | Ampacet 502835 |
| B | Dow Chemical Company (Midland, Michigan, United States of America) | Dow 662I |
| C | Dow Chemical Company (Midland, Michigan, United States of America) | DOWLEX 2045.04 |
| D | Equistar Chemicals (Houston, Texas, United States of America) | PX3410 |
| E | BASF Corporation (Florham Park, New Jersey, United States of America) | ULTRAMID B40LN01 |
| F | Topas Advanced Polymers, Inc. (Florence, Kentucky, United States of America) | Topas 8007 F-04 |
| G | INEOS BAREX, Delaware City, Delaware, United States of America | T50-200-178 |
| H | Dow Chemical Company (Midland, Michigan, United States of America) | ELITE 5400G |

EVOH #1 is ethylene/vinyl alcohol copolymer with 27 mol % ethylene, density of about 1.19-1.21 g/cc and melting point (DSC) of about 191° C.
EVOH #2 is ethylene/vinyl alcohol copolymer with 36.5-39.5 mol % ethylene, density of about 1.17 g/cc, and melting point (DSC) of about 173° C.
EVOH #3 is ethylene/vinyl alcohol copolymer with 44 mol % ethylene.
A is an antiblock with a composition of 16% Silton JC30, 4% Clear Bloc 80 Talc, and 80% Innovene T60-500-119 HDPE.
B is a low density polyethylene (LDPE) with density of 0.918-0.920 g/cc, melting point of a 108° C., and Vicat softening point of 93° C.
C is a linear low density polyethylene (LLDPE) with density of 0.918 to 0.922 g/cc.
D is a maleic anhydride-modified polyethylene with melt index of 0.80-1.40 g/10 minutes and density of 0.913-0.923 g/cc.
E is a polyamide (nylon) with specific gravity 1.12 to 1.16 and DSC melting point of 210-230° C.
F is a cyclic olefin copolymer with density of 1.02 g/cc and melting point 74-82° C.
G is a high density polyethylene (HDPE) with density of 0.950-0.954 g/cc an melt index of 1.8-2.4 g/10 minutes.
H is a linear low density ethylene/octene copolymer with density of 0.914-0.918 g/cc and melting point of 123° C.

Example 1

Preparation of 7-Layer Films 1-13

A blown multi-layer coextrusion process was employed to produce a series of 7-layer films. Table 2, below, provides the compositions of the various films.

TABLE 2

Construction of 7-Layer Films 1-13

| Film ID | Layer # | Components | Mils |
|---|---|---|---|
| Film 1 | 1 | 8% A<br>22% B<br>70% C | 1.92 |
|  | 2 | 100% D | 0.39 |
|  | 3 | 100% E | 0.55 |
|  | 4 | 100% EVOH #1 | 0.55 |
|  | 5 | 100% E | 0.55 |
|  | 6 | 100% D | 0.99 |
|  | 7 | 60% F<br>15% G<br>20% H<br>5% A | 0.55 |
| Film 2 | 1 | 8% A<br>22% B<br>70% C | 1.92 |
|  | 2 | 100% D | 0.39 |
|  | 3 | 100% E | 0.55 |
|  | 4 | 85% EVOH#1<br>15% EVOH #2 | 0.55 |
|  | 5 | 100% E | 0.55 |
|  | 6 | 100% D | 0.99 |
|  | 7 | 60% F<br>15% G<br>20% H<br>5% A | 0.55 |
| Film 3 | 1 | 8% A<br>22% B<br>70% C | 1.92 |
|  | 2 | 100% D | 0.39 |
|  | 3 | 100% E | 0.55 |
|  | 4 | 70% EVOH#1<br>30% EVOH #2 | 0.55 |
|  | 5 | 100% E | 0.55 |
|  | 6 | 100% D | 0.99 |
|  | 7 | 60% F<br>15% G<br>20% H<br>5% A | 0.55 |
| Film 4 | 1 | 8% A<br>22% B<br>70% C | 1.92 |
|  | 2 | 100% D | 0.39 |
|  | 3 | 100% E | 0.55 |
|  | 4 | 55% EVOH#1<br>45% EVOH #2 | 0.55 |
|  | 5 | 100% E | 0.55 |
|  | 6 | 100% D | 0.99 |
|  | 7 | 60% F<br>15% G<br>20% H<br>5% A | 0.55 |
| Film 5 | 1 | 8% A<br>22% B<br>70% C | 1.92 |
|  | 2 | 100% D | 0.39 |
|  | 3 | 100% E | 0.55 |
|  | 4 | 40% EVOH#1<br>60% EVOH #2 | 0.55 |
|  | 5 | 100% E | 0.55 |
|  | 6 | 100% D | 0.99 |
|  | 7 | 60% F<br>15% G<br>20% H<br>5% A | 0.55 |
| Film 6 | 1 | 8% A<br>22% B<br>70% C | 1.92 |
|  | 2 | 100% D | 0.39 |
|  | 3 | 100% E | 0.55 |
|  | 4 | 25% EVOH#1<br>75% EVOH #2 | 0.55 |
|  | 5 | 100% E | 0.55 |
|  | 6 | 100% D | 0.99 |
|  | 7 | 60% F<br>15% G<br>20% H<br>5% A | 0.55 |
| Film 7 | 1 | 8% A<br>22% B<br>70% C | 1.92 |
|  | 2 | 100% D | 0.39 |
|  | 3 | 100% E | 0.55 |
|  | 4 | 100% EVOH #2 | 0.55 |
|  | 5 | 100% E | 0.55 |
|  | 6 | 100% D | 0.99 |
|  | 7 | 60% F<br>15% G<br>20% H<br>5% A | 0.55 |

TABLE 2-continued

Construction of 7-Layer Films 1-13

| Film ID | Layer # | Components | Mils |
|---|---|---|---|
| Film 8 | 1 | 8% A<br>22% B<br>70% C | 1.92 |
|  | 2 | 100% D | 0.39 |
|  | 3 | 100% E | 0.55 |
|  | 4 | 85% EVOH #1<br>15% EVOH #3 | 0.55 |
|  | 5 | 100% E | 0.55 |
|  | 6 | 100% D | 0.99 |
|  | 7 | 60% F<br>15% G<br>20% H<br>5% A | 0.55 |
| Film 9 | 1 | 8% A<br>22% B<br>70% C | 1.92 |
|  | 2 | 100% D | 0.39 |
|  | 3 | 100% E | 0.55 |
|  | 4 | 70% EVOH #1<br>30% EVOH #3 | 0.55 |
|  | 5 | 100% E | 0.55 |
|  | 6 | 100% D | 0.99 |
|  | 7 | 60% F<br>15% G<br>20% H<br>5% A | 0.55 |
| Film 10 | 1 | 8% A<br>22% B<br>70% C | 1.92 |
|  | 2 | 100% D | 0.39 |
|  | 3 | 100% E | 0.55 |
|  | 4 | 55% EVOH #1<br>45% EVOH #3 | 0.55 |
|  | 5 | 100% E | 0.55 |
|  | 6 | 100% D | 0.99 |
|  | 7 | 60% F<br>15% G<br>20% H<br>5% A | 0.55 |
| Film 11 | 1 | 8% A<br>22% B<br>70% C | 1.92 |
|  | 2 | 100% D | 0.39 |
|  | 3 | 100% E | 0.55 |
|  | 4 | 40% EVOH #1<br>60% EVOH #3 | 0.55 |
|  | 5 | 100% E | 0.55 |
|  | 6 | 100% D | 0.99 |
|  | 7 | 60% F<br>15% G<br>20% H<br>5% A | 0.55 |
| Film 12 | 1 | 8% A<br>22% B<br>70% C | 1.92 |
|  | 2 | 100% D | 0.39 |
|  | 3 | 100% E | 0.55 |
|  | 4 | 25% EVOH #1<br>75% EVOH #3 | 0.55 |
|  | 5 | 100% E | 0.55 |
|  | 6 | 100% D | 0.99 |
|  | 7 | 60% F<br>15% G<br>20% H<br>5% A | 0.55 |
| Film 13 | 1 | 8% A<br>22% B<br>70% C | 1.92 |
|  | 2 | 100% D | 0.39 |
|  | 3 | 100% E | 0.55 |
|  | 4 | 100% EVOH #3 | 0.55 |
|  | 5 | 100% E | 0.55 |
|  | 6 | 100% D | 0.99 |
|  | 7 | 60% F<br>15% G<br>20% H<br>5% A | 0.55 |

Example 2

OTR of Films 1-13 at 73° F. and 0% RH

Oxygen transmission rate (OTR) was measured in triplicate for Films 1-13 at 73° F. and 0% RH. OTR was measured in accordance with ASTM D3895, incorporated herein in its entirety by reference thereto. Results are shown in Table 3, below. A, B, and C represent the three replicates of each film tested.

Figure 2:
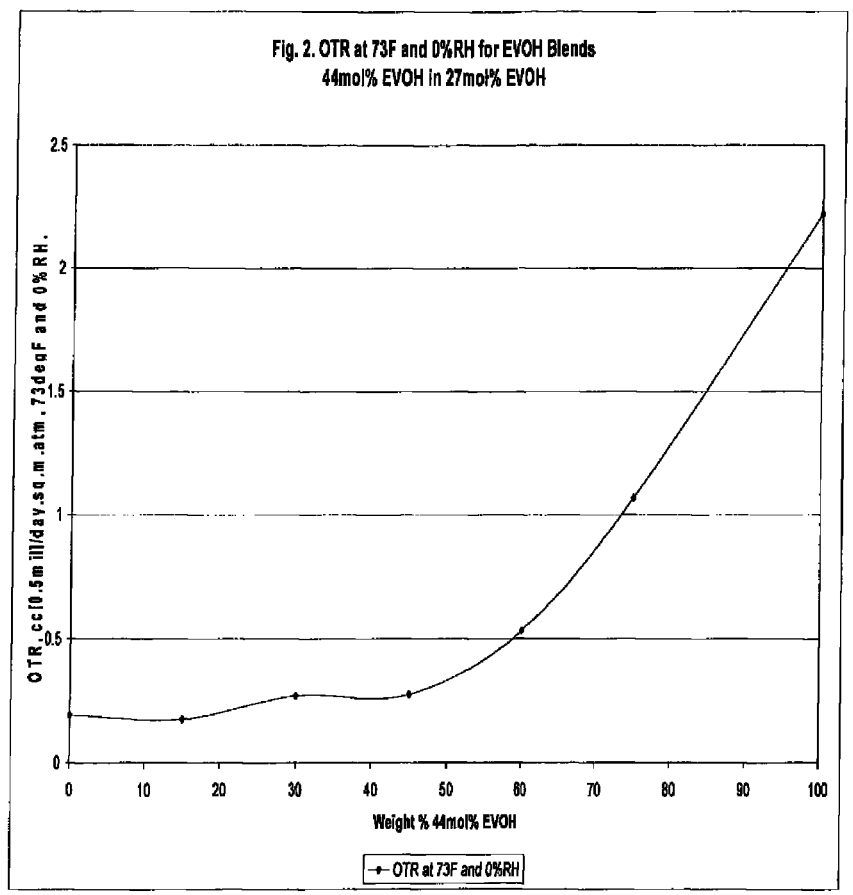
FIG. 2 is a line graph illustrating the weight % of 44 mol % EVOH in the barrier layer of some embodiments of the disclosed films versus oxygen transmission rate at 73° F. and 0% RH.

FIG. 2 is a graph of the weight % of 44 mol % EVOH in the barrier layer of Films 1, 8-13 versus OTR at 73° F. and 0% RH. FIG. 2 illustrates that up to about 20 weight % 44 mol % EVOH there was no change in OTR at 0% RH when compared to Film 1. In addition, up to about 40 weight % 44 mol % EVOH, a very small amount of change in OTR was exhibited when compared to Film 1.

TABLE 3

OTR of Films 1-13 at 73° F. and 0% RH

| Sample | Specimen | OTR (cc/m$^2$/day) | Gauge Mils |
|---|---|---|---|
| Film 1 | A | 0.2 | 6.21 |
|  | B | 0.2 | 5.97 |
|  | C | 0.2 | 5.06 |
| Film 2 | A | 0.2 | 6.07 |
|  | B | 0.2 | 5.58 |
|  | C | 0.2 | 5.19 |
| Film 3 | A | 0.2 | 5.92 |
|  | B | 0.2 | 5.83 |
|  | C | 0.2 | 5.26 |
| Film 4 | A | 0.9 | 5.74 |
|  | B | 1.2 | 5.68 |
|  | C | 1.2 | 4.76 |
| Film 5 | A | 1.3 | 5.61 |
|  | B | 1.2 | 5.73 |
|  | C | 1.2 | 5.01 |
| Film 6 | A | 0.6 | 5.79 |
|  | B | 0.6 | 5.58 |
|  | C | 0.6 | 5.08 |
| Film 7 | A | 0.8 | 5.70 |
|  | B | 0.7 | 5.74 |
|  | C | 0.8 | 5.04 |
| Film 8 | A | <0.2 | 5.21 |
|  | B | <0.2 | 5.54 |
|  | C | 0.2 | 5.50 |
| Film 9 | A | 0.3 | 5.72 |
|  | B | 0.3 | 5.97 |
|  | C | <0.2 | 5.44 |
| Film 10 | A | 0.2 | 5.72 |
|  | B | 0.4 | 5.81 |
|  | C | 0.3 | 5.12 |
| Film 11 | A | 0.5 | 5.96 |
|  | B | 0.7 | 5.46 |
|  | C | 0.4 | 5.37 |
| Film 12 | A | 1.0 | 5.86 |
|  | B | 1.1 | 6.06 |
|  | C | 1.0 | 5.43 |
| Film 13 | A | 2.5 | 5.22 |
|  | B | 2.4 | 5.53 |
|  | C | 2.2 | 5.72 |

Example 3

OTR of Films 1-13 at 73° F. and 100% RH

The oxygen transmission rate (OTR) for films 1-13 was measured in triplicate at 73° F. and 100% RH. OTR was measured as in Example 2. Results are shown in Table 4, below. A, B, and C represent the three replicates of each film sample tested at day 18, after OTR had stabilized.

FIG. 1 is a graph of the weight % of 44 mol % EVOH in the barrier layer of Films 1, 8-13 versus OTR at 73° F. and 100% RH. FIG. 1 shows the unexpected improvement in wet OTR for Films 8 and 9 compared to either Film 1 or Film 13.

TABLE 4

OTR of Films 1-13 at 73° F. and 100% RH

| Sample | Specimen | OTR (cc/m$^2$/day) | Gauge Mils |
|---|---|---|---|
| Film 1 | A | 19 | 5.16 |
| | B | 17 | 5.49 |
| | C | 16 | 5.70 |
| Film 2 | A | 18 | 5.47 |
| | B | 16 | 5.79 |
| | C | 15 | 6.10 |
| Film 3 | A | 20 | 5.16 |
| | B | 19 | 5.32 |
| | C | 18 | 5.47 |
| Film 4 | A | 19 | 5.15 |
| | B | 17 | 5.47 |
| | C | 14 | 5.84 |
| Film 5 | A | 18 | 5.14 |
| | B | 16 | 5.39 |
| | C | 18 | 5.42 |
| Film 6 | A | 19 | 5.02 |
| | B | 18 | 5.32 |
| | C | 18 | 5.60 |
| Film 7 | A | 16 | 5.24 |
| | B | 15 | 5.51 |
| | C | 14 | 5.59 |
| Film 8 | A | 12 | 5.82 |
| | B | 14 | 5.22 |
| | C | 14 | 5.12 |
| Film 9 | A | 13 | 5.64 |
| | B | 12 | 5.67 |
| | C | 13 | 5.80 |
| Film 10 | A | 16 | 5.22 |
| | B | 16 | 5.45 |
| | C | 13 | 5.71 |
| Film 11 | A | 16 | 5.18 |
| | B | 13 | 5.86 |
| | C | 12 | 5.94 |
| Film 12 | A | 14 | 5.27 |
| | B | 15.6 | 5.48 |
| | C | 13 | 5.70 |
| Film 13 | A | 12 | 6.18 |
| | B | 14 | 5.98 |
| | C | 15 | 5.12 |

What is claimed is:

1. A method of making a barrier film, the method comprising:
   a. extruding a blend of a primary barrier component and a secondary barrier component through a slot die or through an annular die so that an extrudate is formed; and
   b. either:
      i. casting the extrudate onto a chilled roller so that the extrudate cools to form a cast film; or
      ii. orienting the extrudate as it cools and solidifies such that a film is formed;
   wherein the primary barrier component is present in a layer of the film an amount of from about 65 to 95 weight percent, based on blend weight, the primary barrier component comprising ethylene vinyl alcohol copolymer having an ethylene unit content ranging from 21 to 30 mol %; and
   wherein the secondary barrier component is present in the layer in an amount of from about 5 to 55 weight percent, based on blend weight, the secondary barrier component comprising ethylene vinyl alcohol copolymer having an ethylene unit content ranging from 41 to 50 mol %.

2. The method of claim 1, wherein the primary barrier component comprises ethylene vinyl alcohol copolymer having an ethylene unit content ranging from 25 to 28 mol %.

3. The method of claim 1, wherein the secondary barrier component comprises an ethylene vinyl alcohol copolymer ranging from 43 to 45 mol %.

4. The method of claim 1, wherein the film has an oxygen transmission rate of from about 0.1 to 30 cc/m$^2$/day at 73° F., 1 atmosphere, and 0% relative humidity, measured in accordance with ASTM D-3985.

5. The method of claim 1, wherein the film has an oxygen transmission rate of less than about 50 cc/m$^2$/day at 73° F., 1 atmosphere, and 100% relative humidity, measured in accordance with ASTM D-3985.

6. The method of claim 1, wherein the composition and amount of the primary barrier component and the secondary barrier component are selected such that the oxygen barrier layer exhibits an oxygen transmission rate lower than a layer of the same thickness composed of 100 weight percent primary barrier component.

7. A method of making a barrier film, the method comprising:
   a. extruding an unoriented, tubular, collapsible thermoplastic substrate;
   b. cooling the substrate to a temperature below its melt temperature;
   c. inflating the substrate to form an inflated tubular substrate;
   d. passing the inflated tubular substrate through a coating die;
   e. trapping the portion of said inflated, tubular substrate that passes through said coating die between two spaced apart pairs of pinch rollers;
   f. extruding a molten coating layer of thermoplastic material from the circular coating die, onto and around the inflated tubular substrate, so that a coated multilayer film is produced;
   g. heating the coated multilayer film to a temperature of from about 180° F. to about 220° F. and orienting the coated multilayer film product while the coated multilayer film is in the solid state, whereby a heat-shrinkable multilayer film is produced; and wherein the coating layer comprises a blend of:
      i. a primary barrier component present in an amount of from about 65 to 95 weight percent, based on blend weight, the primary barrier component comprising ethylene vinyl alcohol copolymer having an ethylene unit content ranging from 21 to 30 mol %; and
      ii. a secondary barrier component present in an amount of from about 5 to 55 weight percent, based on blend weight, the secondary barrier component comprising ethylene vinyl alcohol copolymer having an ethylene unit content ranging from 41 to 50 mol %.

8. The method of claim 7, wherein the primary barrier component comprises an ethylene vinyl alcohol copolymer having an ethylene unit content ranging from 25 to 28 mol %.

9. The method of claim 7, wherein the secondary barrier component comprises an ethylene vinyl alcohol copolymer having an ethylene unit content ranging from 43 to 45 mol %.

10. The method of claim 7, wherein the film has an oxygen transmission rate of from about 0.1 to 30 cc/m$^2$/day at 73° F., 1 atmosphere, and 0% relative humidity, measured in accordance with ASTM D-3985.

11. The method of claim 7, wherein the film has an oxygen transmission rate of less than about 50 cc/m$^2$/day at 73° F., 1 atmosphere, and 100% relative humidity, measured in accordance with ASTM D-3985.

12. A method of making a package, said method comprising:
   a. providing a first polymeric film comprising a layer comprising a blend of:
      i. a primary barrier component present in the layer in an amount of from about 65 to 95 weight percent, based on the blend weight, the primary barrier component comprising ethylene vinyl alcohol copolymer having an ethylene unit content ranging from 21 to 30 mol %; and
      ii. a secondary barrier component present in the layer in an amount of from about 5 to 55 weight percent, based on blend weight, the secondary barrier component comprising ethylene vinyl alcohol copolymer having an ethylene unit content ranging from 41 to 50 mol %;
   b. heat sealing the film upon itself or to another film to form an enclosed package for a product.

13. The method of claim 12, wherein the primary barrier component comprises an ethylene vinyl alcohol copolymer having an ethylene unit content ranging from 25 to 28 mol %.

14. The method of claim 12, wherein the secondary barrier component comprises an ethylene vinyl alcohol copolymer having an ethylene unit content ranging from 43 to 45 mol %.

15. The method of claim 12, wherein the film has an oxygen transmission rate of from about 0.1 to 30 cc/m$^2$/day at 73° F., 1 atmosphere, and 0% relative humidity, measured in accordance with ASTM D-3985.

16. The method of claim 12, wherein the film has an oxygen transmission rate of less than about 50 cc/m$^2$/day at 73° F., 1 atmosphere, and 100% relative humidity, measured in accordance with ASTM D-3985.

17. The method of claim 12, wherein said film is a multilayer film comprising first layer containing a thermoplastic polymer and a second layer that serves as a barrier layer, the second layer comprising the blend of the primary barrier component and the secondary barrier component.

18. The method of claim 17, wherein the first layer is a first outer film layer and the second layer is an inner film layer, with the multilayer film further comprising a third layer that is a second outer film layer that serves as an abuse layer, the second outer layer comprising at least one member selected from the group consisting of ethylene/alpha-olefin copolymer, ethylene homopolymer, propylene/alpha-olefin copolymer, propylene homopolymer, and combinations thereof.

19. The method of claim 17, wherein said film further comprises:
   a. a fourth layer that serves as a first tie layer and that is between the first layer and the second layer, the fourth layer comprising at least one member selected from the group consisting of: anhydride modified polymer, polyamide, blends of polyamide, and combinations thereof; and
   b. a fifth layer that serves as a second tie layer and that is between the second layer and the third layer, the fifth layer comprising at least one member selected form the group consisting of: anhydride modified polymer, polyamide, blends of polyamide, and combinations thereof.

20. The method of claim 17, wherein said multilayer film further comprises a sixth layer that is an inner layer serving as a bulk layer, and that comprises at least one member selected from the group consisting of ethylene/alpha- olefin copolymer, ethylene homopolymer, propylene/alpha-olefin copolymer, propylene homopolymer, and combinations thereof, the sixth layer being either between the first layer and the fourth layer, or between the second layer and the fifth layer

* * * * *